(12) United States Patent
Ikeda et al.

(10) Patent No.: US 7,357,449 B2
(45) Date of Patent: Apr. 15, 2008

(54) SUNROOF DEVICE

(75) Inventors: Atsushi Ikeda, Kariya (JP); Takashi Kikuta, Kariya (JP); Kentaro Hirose, Yokkaichi (JP); Nobuyasu Bessho, Toyota (JP); Kinju Uchida, Kariya (JP); Samson Asfaw, Plymouth, MI (US); Kenji Hori, Novi, MI (US); Robert Gore, Ann Arbor, MI (US); Hiroshi Makino, Wixom, MI (US)

(73) Assignees: Aisin Seiki Kabushiki Kaisha, Kariya-shi, Aichi-Ken (JP); Aisin World Corp. of America, Plymouth, MI (US)

( * ) Notice: Subject to any disclaimer, the term of this patent is extended or adjusted under 35 U.S.C. 154(b) by 12 days.

(21) Appl. No.: 11/315,240

(22) Filed: Dec. 23, 2005

(65) Prior Publication Data

US 2007/0145787 A1 Jun. 28, 2007

(51) Int. Cl.
*B60J 7/057* (2006.01)
(52) U.S. Cl. .................................................... 296/223
(58) Field of Classification Search ................. 296/223
See application file for complete search history.

(56) References Cited

U.S. PATENT DOCUMENTS 5,372,401 A * 12/1994 Odoi et al. ................. 296/214
6,056,352 A * 5/2000 Ewing et al. ............... 296/214
7,030,509 B2 * 4/2006 Okada et al. .............. 307/10.1
2004/0104606 A1 * 6/2004 Ritter ......................... 296/223

FOREIGN PATENT DOCUMENTS

| JP | 07-149153 | 6/1995 |
| JP | 07-305561 | 11/1995 |
| JP | 07-305562 | 11/1995 |

\* cited by examiner

*Primary Examiner*—Dennis H. Pedder
(74) *Attorney, Agent, or Firm*—Buchanan Ingersoll & Rooney PC

(57) ABSTRACT

A sunroof device includes a roof panel having a first opening portion, a ceiling member having a second opening portion so as to face the first opening portion, a movable panel moved between a full-closed position and an open position, the movable panel passing through a half-closed position, a motor for driving the movable panel, a controlling means for controlling an operation of the motor, an operating member to be operated or released by a passenger in the vehicle, and a switch for inputting an operation signal for operating the motor, and inputting a stop signal for stopping the motor. The controlling means drives the motor until the movable panel reaches the full-closed position while moving towards the full-closed position by the operating member being operated even if the operating member is released after the movable panel reaches the half-closed position.

12 Claims, 10 Drawing Sheets

Front ←——→ Rear

US 7,357,449 B2

SUNROOF DEVICE

CROSS REFERENCE TO RELATED APPLICATIONS

FIELD OF THE INVENTION

This invention generally relates to a sunroof device for a vehicle.

BACKGROUND

A known sunroof device disclosed in Japanese Patent Publication Laid-open JP07-149153 published on Jun. 13, 1995. The sunroof device includes a roof panel for forming an exterior of a vehicle and having an outer opening portion, a ceiling member for forming a ceiling of a vehicle interior (i.e. interior space of a vehicle) below the roof panel, a slide panel moved between a closed position in which the outer opening portion is closed and an open position in which the outer opening portion is open, and a drive mechanism for moving the slide panel in a vehicle forward direction so as to close the outer opening portion. In addition, an operating portion is provided on the ceiling member so as to operate the drive mechanism. Further, an inner opening portion is formed on the ceiling member so as to face the outer opening portion of the roof panel. The inner opening portion is arranged below the outer opening portion. A front edge of the outer opening portion is positioned on a front side in the vehicle relative to a front edge of the inner opening portion.

According to the aforementioned sunroof device, the front edge of the outer opening portion is positioned on a front side in the vehicle relative to the front edge of the inner opening portion. Thus, when a passenger in a vehicle intends to close the outer opening portion, the slide panel moving in the vehicle forward direction passes over the front edge of the inner opening portion and closes the inner opening portion of the ceiling member before the outer opening portion of the roof panel is completely closed. That is, depending on a timing of the drive mechanism to stop, it may be possible that the outer opening portion is not completely closed even if the inner opening portion is closed by the slide panel. Therefore, the passenger in the vehicle interior may wrongly recognize that the outer opening portion is closed as well as the inner opening portion even though the outer opening portion is actually not completely closed.

According to the sunroof device disclosed, an opening portion may not be completely closed even if a passenger intends to close the opening portion because of an incomplete closed position of the slide panel.

Thus, a need exists for a sunroof device that can prevent a slide panel from stopping in an incomplete closed position.

SUMMARY OF THE INVENTION

According to an aspect of the present invention, a sunroof device includes a roof panel for forming an exterior of a vehicle and having a first opening portion, a ceiling member for forming a ceiling of a vehicle interior below the roof panel and having a second opening portion so as to face the first opening portion, a movable panel moved between a full-closed position in which the first opening portion is completely closed and an open position in which the first opening portion is open, the movable panel passing through a half-closed position in which a part of the first opening portion is open and the second opening portion is closed when the movable panel moves between the full-closed position and the open position, a motor for driving the movable panel, a controlling means for controlling an operation of the motor, an operating member to be operated or released by a passenger in the vehicle, and a switch for inputting an operation signal for operating the motor only while the operation member is operated, and inputting a stop signal for stopping the motor when the operation member is released. The controlling means drives the motor until the movable panel reaches the full-closed position while moving towards the full-closed position by the operating member being operated even if the operating member is released after the movable panel reaches the half-closed position.

According to another aspect of the present invention, a sunroof device includes a roof panel for forming an exterior of a vehicle and having a first opening portion, a ceiling member for forming a ceiling of a vehicle interior below the roof panel and having a second opening portion so as to face the first opening portion, a movable panel moved between a full-closed position in which the first opening portion is completely closed and an open position in which the first opening portion is open, the movable panel passing through a half-closed position in which a part of the first opening portion is open and the second opening portion is closed when the movable panel moves between the full-closed position and the open position, a motor for driving the movable panel, a controlling means for controlling an operation of the motor, an operating member to be operated or released by a passenger in the vehicle, and a switch for inputting an operation signal for operating the motor only while the operation member is operated, and inputting a stop signal for stopping the motor when the operation member is released. The controlling means controls the motor to operate until the movable panel passes over at least the half-closed position while moving from the full-closed position by the operating member being operated even if the operating member is released after once operated.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention is explained with reference to the attached drawings.

Figure 1:
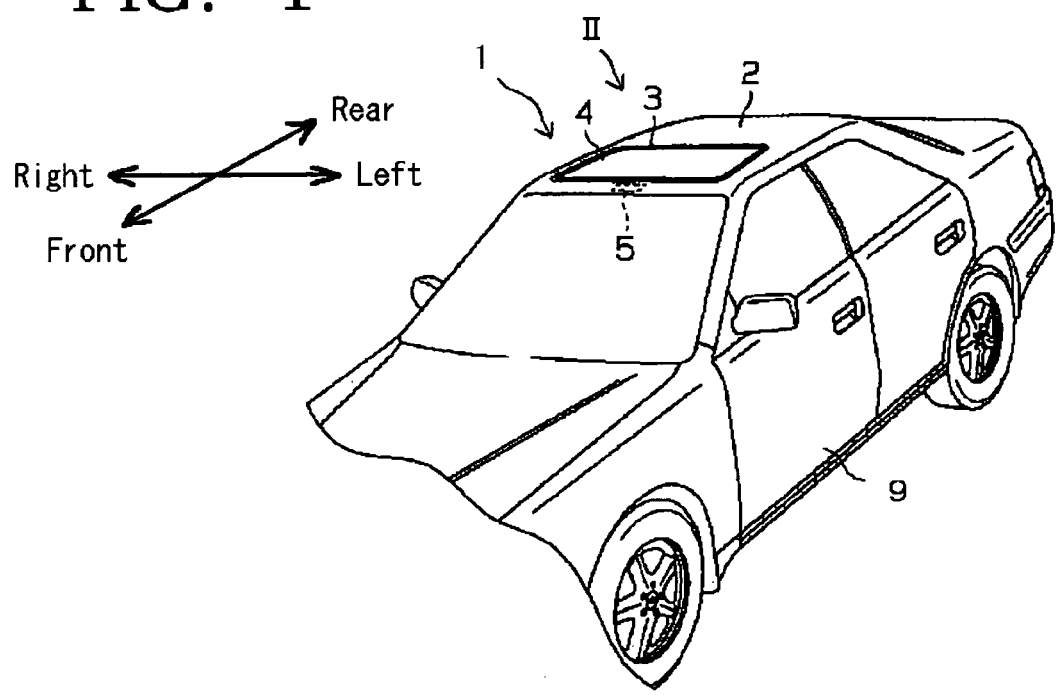
FIG. 1 is a perspective view of a vehicle equipped with a sunroof device according to an embodiment of the present invention.

FIG. 1 is a perspective view of a vehicle equipped with a sunroof device 1 according to the present embodiment. An opening portion 3 is formed on a roof 2 of the vehicle. The opening portion 3 is opened or closed by means of a movable panel 4. The movable panel 4 is driven by means of a drive unit provided on the roof 2.

Figure 2:
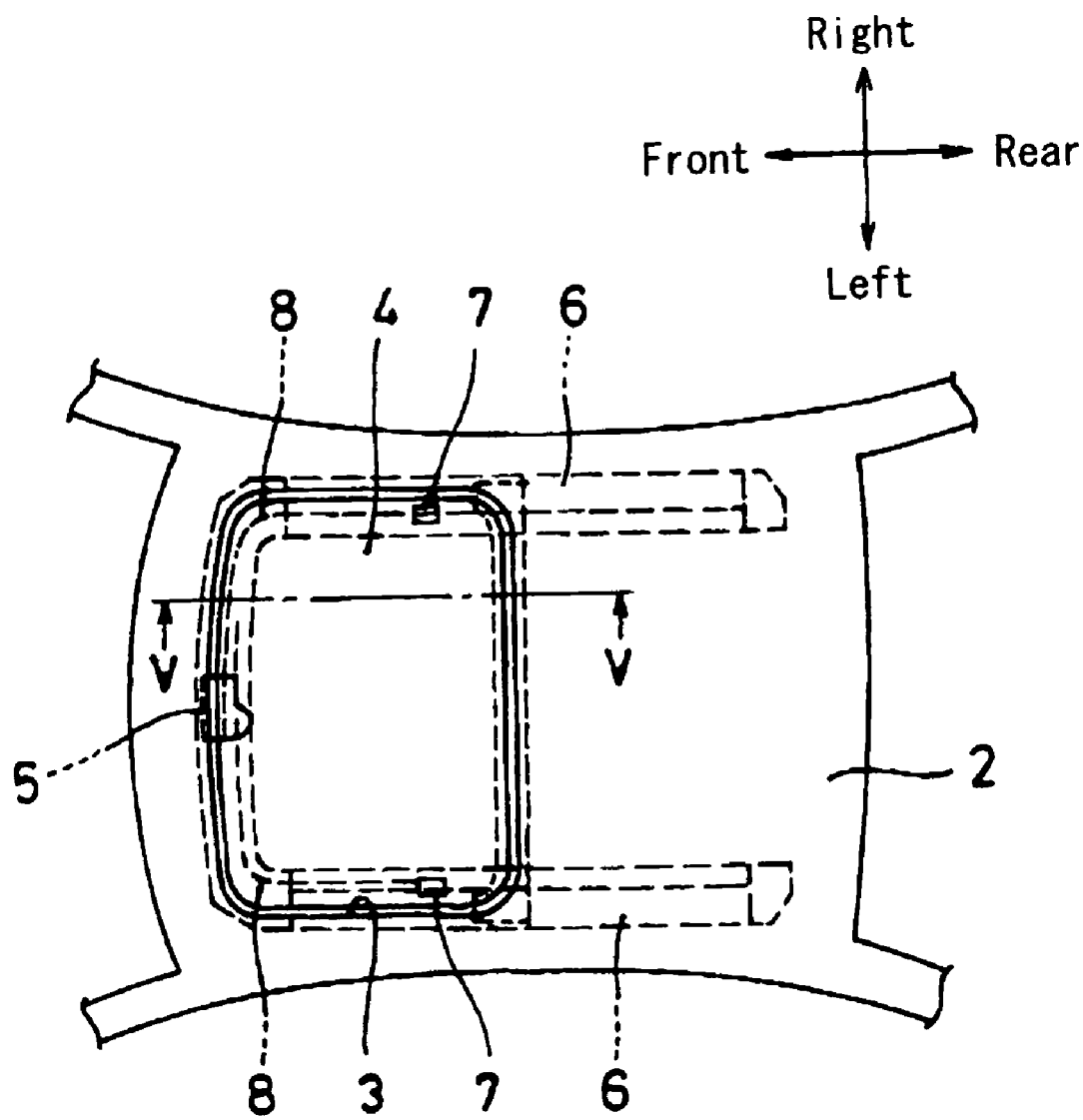
FIG. 2 is a top view of the vehicle as seen from II direction of FIG. 1.
Figure 3:
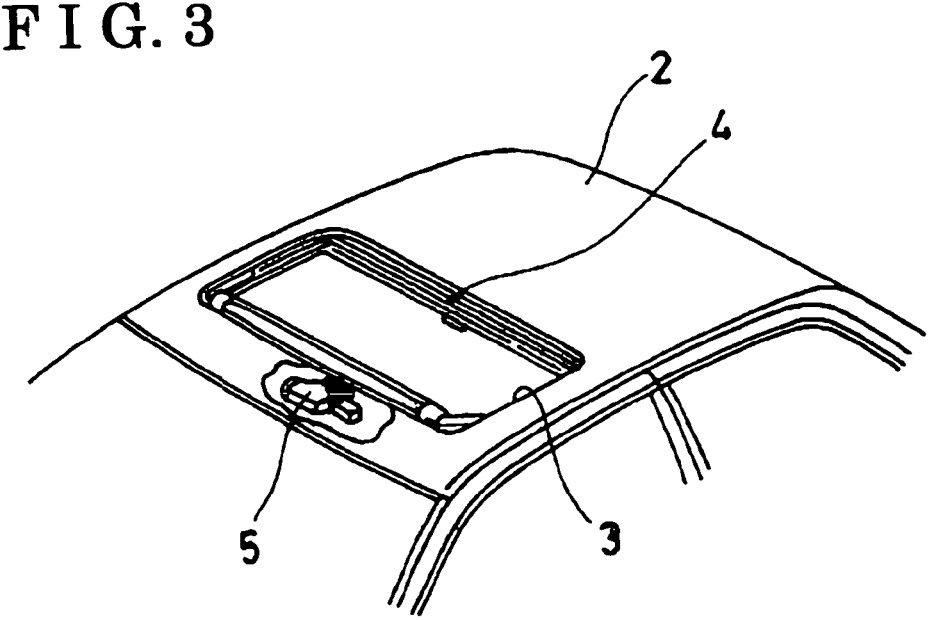
FIG. 3 is a perspective view showing an operation of a movable panel.
Figure 4:
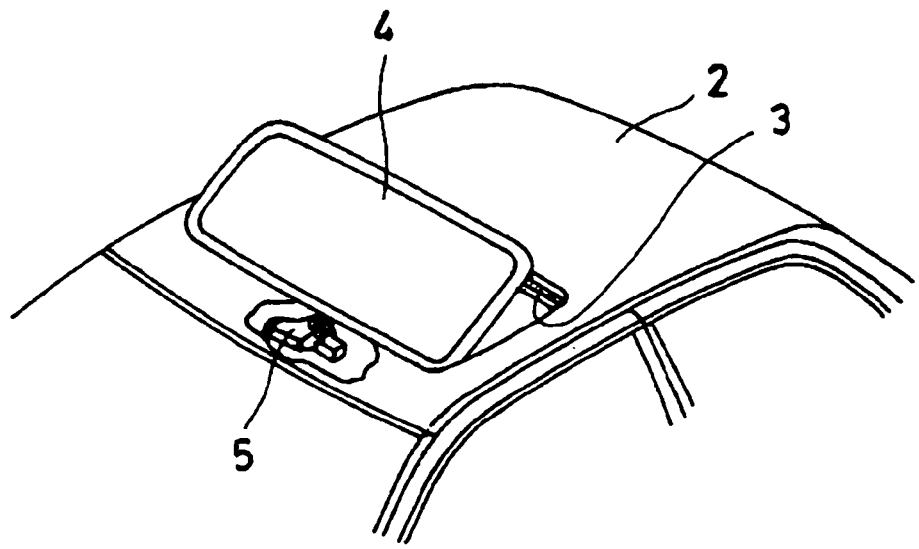
FIG. 4 is a perspective view showing an operation of the movable panel.

FIG. 2 is a top view of the vehicle as seen from II direction of FIG. 1. FIGS. 3 and 4 are exploded views of the vicinity of the roof 2 for showing an operation of the movable panel 4. A pair of guide rails 6 are provided on the roof 2. Precisely, the two guide rails 6 are respectively arranged on both sides in a width direction of the vehicle. The pair of guide rails 6 support sliders 7 respectively in such a manner that the sliders 7 are slidable in a vehicle longitudinal direction. The sliders 7 are each connected to a bracket (not shown) attached to a lower face of the movable panel 4. The drive unit 5 includes a motor 51 (see FIG. 7) and a deceleration mechanism, which is a known structure. The drive unit 5 is connected to the sliders 7 by means of respective cables 8. When the drive unit 5 is powered, the motor 51 is driven, which then causes a rotation of an output shaft (not shown) of the motor 51 in one direction or the other direction. The rotation of the output shaft of the motor 51, i.e. a driving force, is transmitted to the cables 8 by means of the deceleration mechanism. Then, each cable 8 moves in forward or rearward direction of the vehicle in response to a rotation direction of the output shaft of the motor 51. The sliders 7 connected to the cables 8 move along the respective guide rails 6. Precisely, the movable panel 4 connected to the sliders 7 performs a sliding operation in which the movable panel 4 moves between a full-closed position (see FIG. 2) and a slide-open position (see FIG. 3), and a tilting operation in which the movable panel 4 moves between the full-closed position and a tilt-up position (see FIG. 4).

Figure 5A:
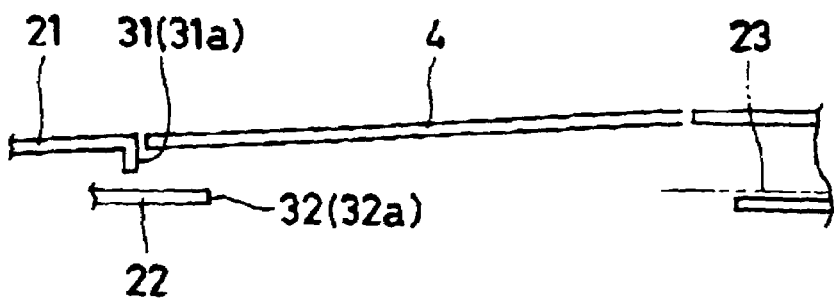
FIG. 5A, 5B, and 5C are schematic views showing a sliding operation of the movable panel.
Figure 5B:
Figure 5C:
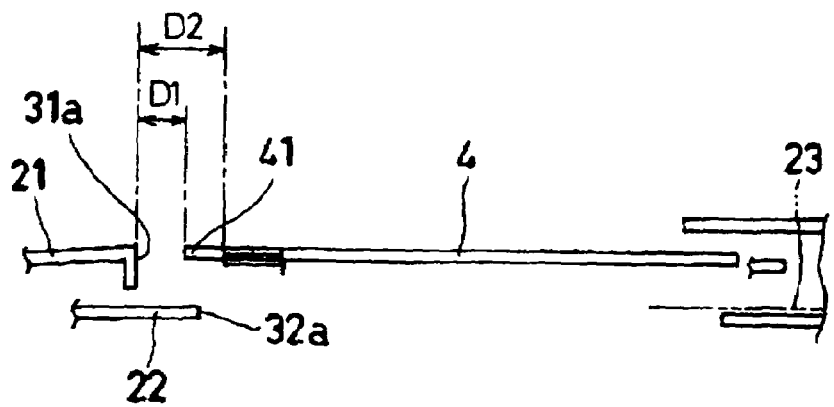
Figure 6A:
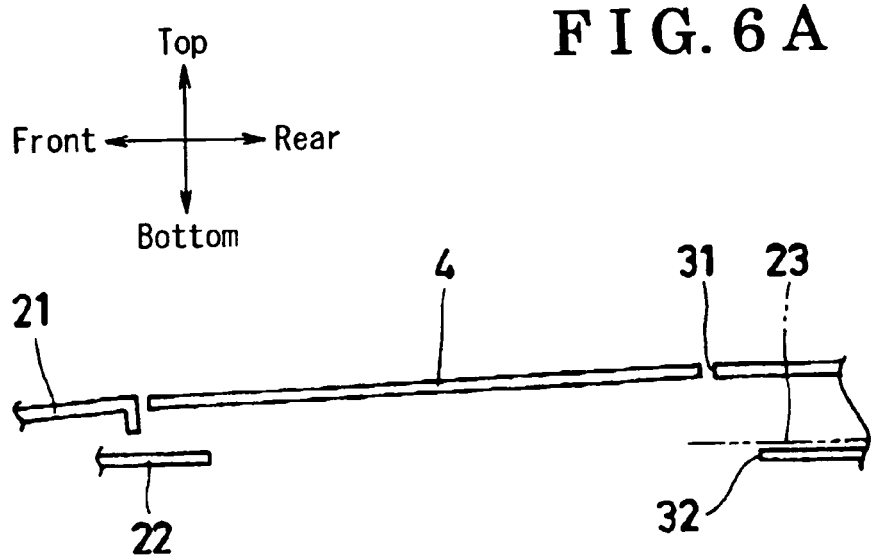
FIG. 6A, 6B, and 6C are schematic views showing a tilting operation of the movable panel.
Figure 6B:
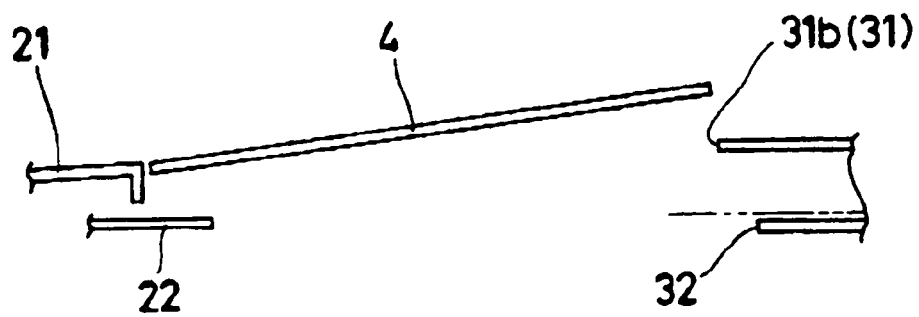
Figure 6C:
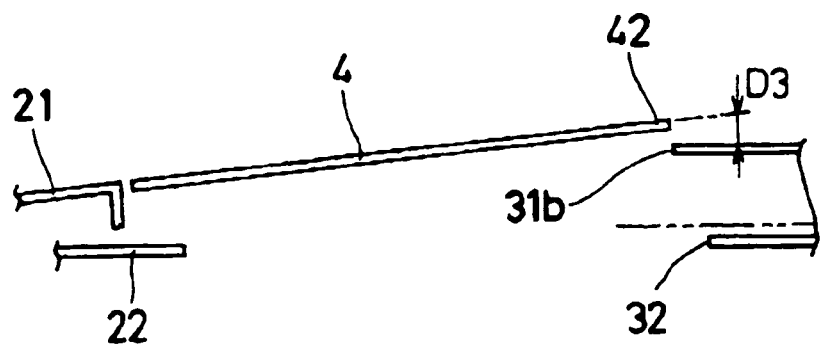

FIGS. 5A to 5C, and 6A to 6C are schematic cross-sectional views each taken along the line V-V of FIG. 2. FIGS. 5A, 5B, and 5C show the sliding operation of the movable panel 4 while FIGS. 6A, 6B, and 6C show the tilting operation of the movable panel 4.

The roof 2 of a vehicle includes a roof panel 21 forming an exterior of the vehicle, and a ceiling member 22 forming a ceiling of a vehicle interior (i.e. interior space) below the roof panel 21. An outer opening portion 31 is formed on the roof panel 21 while an inner opening portion 32 is formed on the ceiling member 22 so as to face the outer opening portion 31. The inner opening portion 32 is arranged below the outer opening portion 31. The outer opening portion 31 and the inner opening portion 32 form the opening portion 3 of the roof 2. A front edge 31a of the outer opening portion 31 is positioned on a front side in the vehicle relative to a front edge 32a of the inner opening portion 32. The outer opening portion 31 of the roof panel 21 is opened or closed by the movable panel 4 on an upper side of the ceiling member 22. The inner opening portion 32 of the ceiling member 22 is opened or closed by a sunshade 23 having a known structure.

In the sliding operation shown in FIGS. 5A, 5B, and 5C, the movable panel 4 moves in the vehicle longitudinal direction between the full-closed position shown in FIG. 5A and the slide-open position shown in FIG. 5B. Since the front edge 31a of the outer opening portion 31 is positioned on the front side in the vehicle relative to the front edge 32a of the inner opening portion 32, the movable panel 4 passes over the front edge 32a of the inner opening portion 32 of the ceiling member 22 before the outer opening portion 31 of the roof panel 21 is completely closed in cases where the movable panel 4 moves in a vehicle forward direction from the slide-open position. When the movable panel 4 passes over the front edge 32a of the inner opening portion 32 while moving in the frontward direction, the inner opening portion 32 is covered by the movable panel 4. That is, when the movable panel 4 moves between the full-closed position and the slide-open position, the movable panel 4 passes through a half-closed position as shown in FIG. 5C in which a part of the outer opening portion 31 is open and at the same time the inner opening portion 32 is covered. In detail, as shown in FIG. 5C, a position of the movable panel 4 in which a distance between a front edge 41 of the movable panel 4 and the front edge 31a of the outer opening portion 31 is D1 is defined as the half-closed position of the movable panel 4.

In cases where the movable panel 4 is positioned between the half-closed position and the full-closed position, the inner opening portion 32 is covered by the movable panel 4 when viewed by a passenger in the vehicle interior. At this time, however, the outer opening portion 31 is not always covered completely by the movable panel 4 even if the inner opening portion 32 is covered by the movable panel 4. That is, in cases where the movable panel 4 is positioned between the half-closed position and the full-closed position, it may be difficult for a passenger to recognize or determine whether the outer opening portion 31 arranged above the inner opening portion 32 is completely closed. The passenger may wrongly determine that the outer opening portion 31 is completely closed even though in fact the outer opening portion 31 is not completely closed. The sunroof device 1 according to the present embodiment prevents the movable panel 4 moving in the forward direction (i.e. slide-close direction) from stopping in an incomplete position, i.e. stopping between the half-closed position and the full-closed position.

Meanwhile, in cases where the movable panel 4 moving in a vehicle rearward direction (i.e. slide-open direction) is positioned between the full-closed position and the half-closed position, a passenger may also wrongly recognize that the outer opening portion 31 is completely closed. When the front edge 41 of the movable panel 4 passes over the front edge 32a of the inner opening portion 32 of the ceiling member 22, the passenger can recognize that the outer opening portion 31 is open. That is, if the movable panel 4 moving in the rearward direction passes over at least the half-closed position, the passenger can recognize that the outer opening portion 31 is open. According to the present embodiment, as shown in FIG. 5C, a position of the movable panel 4 in which a distance between the front edge 41 of the movable panel 4 and the front edge 31a of the outer opening portion 31 is D2 is defined as an open recognition position. The D2 is specified larger than the D1.

In the tilting operation as shown in FIGS. 6A, 6B, and 6C, the movable panel 4 is tilted up or down with reference to a front portion thereof between the full-closed position shown in FIG. 6A and a tilt-up position shown in FIG. 6B. In cases where the movable panel 4 is positioned in the vicinity of the full-closed position as shown in FIG. 6C, a field of view of a passenger is blocked by the sunshade 23 formed on the ceiling member 22 and the like. Thus, it is difficult for the passenger to recognize or determine whether the outer opening portion 31 arranged above the inner opening portion 32 is completely closed. According to the present embodiment, as shown in FIG. 6C, a position of the movable panel 4 in which a distance between a rear edge 42 of the movable panel 4 and a rear edge 31b of the outer opening portion 31 is D3 is defined as a blind position.

Figure 7:
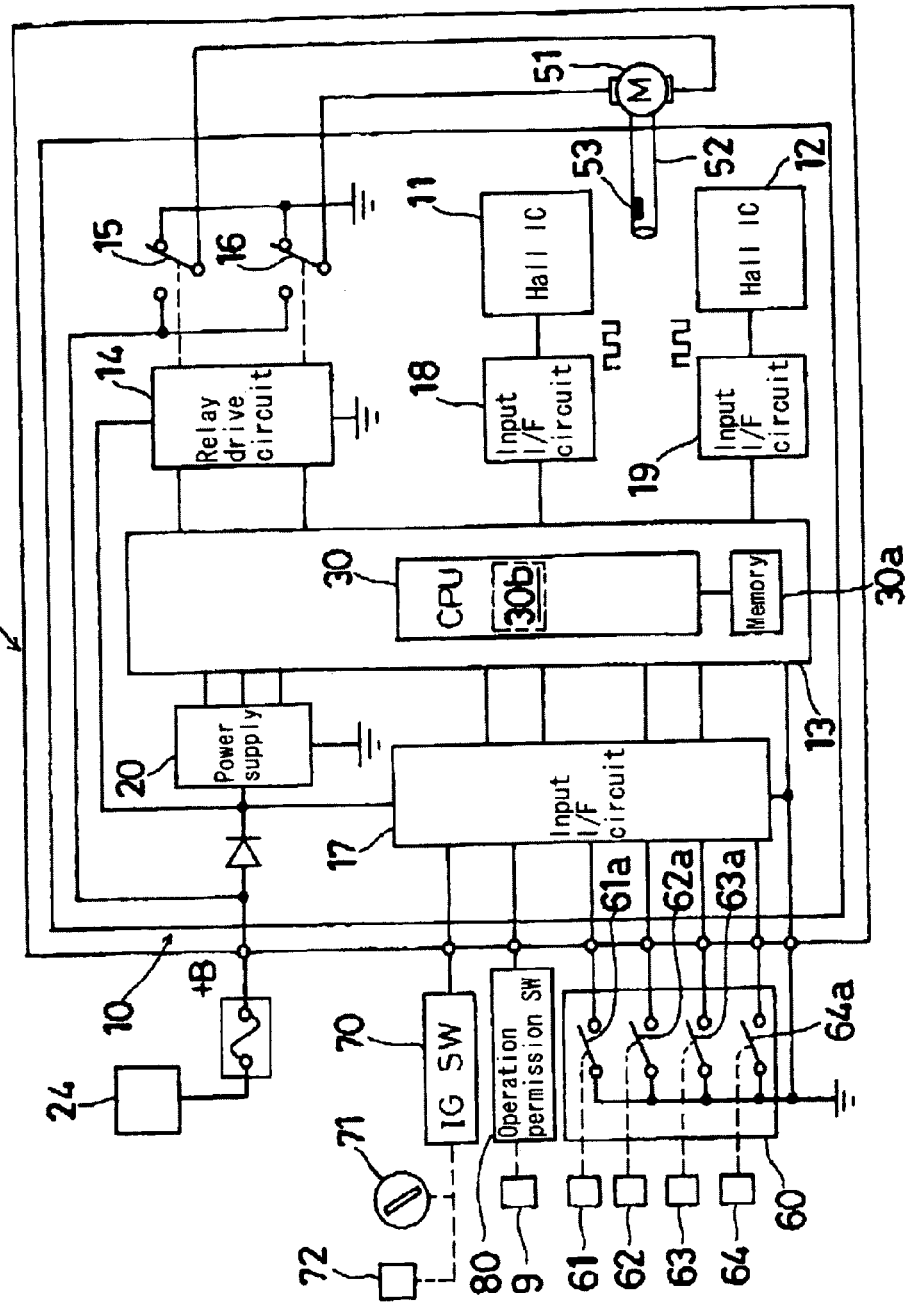
FIG. 7 is a block diagram of the sunroof device.

FIG. 7 is a block view of the sunroof device 1. An operation of the motor 51 in the drive unit 5 is controlled by an ECU 10. A predetermined power is supplied to the ECU 10 from a battery 24. The ECU 10 is connected to an operation switch 60, an ignition switch 70 (hereinafter called IG switch), and an operation permission switch 80. The ECU 10 receives respective signals from the switches 60, 70 and 80, and then, in response to those input signals, drives the motor 51 in the drive unit 5.

The ECU 10 includes Hall ICs 11 and 12, a microcomputer 13, a relay drive circuit 14, relays contact 15 and 16, input interface circuits 17, 18, and 19, and a power regulator 20.

The Hall ICs 11 and 12 are respectively arranged so as to face an output shaft 52 of the motor 51 as shown in FIG. 7. The output shaft 52 of the motor 51 is equipped with a magnet 53. When the motor 51 is operated, the output shaft 52 holding the magnet 53 is rotated, thereby causing change of magnetic flux passing over the Hall ICs 11 and 12. The Hall ICs 11 and 12 detect the change of magnetic flux and then output pulse signals respectively. The pulse signals output from the Hall ICs 11 and 12 are input to the microcomputer 13 by means of the respective input interface circuits 18 and 19. The microcomputer 13 detects a rotation speed and a rotation direction of the output shaft 52 of the motor 51 based on the pulse signals.

A predetermined power is supplied to the microcomputer 13 from the battery 24 by means of the power regulator 20. The microcomputer 13 includes a CPU 30 and a memory 30a. The memory 30a stores a control program and the like. In addition, the CPU 30 includes a counter 30b, which counts pulse signals input to the microcomputer 13. The memory 30a stores and updates the number of counts (hereinafter called "count data") counted by the counter 30b. The count data of the counter 30b is incremented (i.e. increased) when the output shaft of the motor 51 is rotated in one direction while the count data is decremented (i.e. decreased) when the output shaft of the motor 51 is rotated in the other direction. That is, the count data of the counter 30b corresponds to a position of the movable panel 4 and changes in response to the movement of the movable panel 4. The memory 30a stores position data corresponding to the aforementioned full-closed position, the half-closed position D1 (first position data), the open recognition position D2 (second position data), the blind position D3, and the like. The CPU 30 detects a position of the movable panel 4 based on the count data of the counter 30b. The CPU 30 determines whether or not the movable panel 4 is in the half-closed position, for example, by comparing the count data of the counter 30b and the position data stored in the memory 30a.

The operation switch 60 includes buttons 61 and 62 for sliding operation, buttons 63 and 64 for tilting operation, and switches 61a, 62a, 63a and 64a corresponding to the buttons 61 to 64 respectively. The buttons 61 to 64 are operated by a passenger of the vehicle. The button 61 activates the movable panel 4 to move in the slide-close direction. When the button 61 is operated, the movable panel 4 moves towards the full-closed position with the sliding operation. The button 62 activates the movable panel 4 to move in the slide-open direction. When the button 62 is operated, the movable panel 4 moves towards the slide-open position with the sliding operation. The button 63 activates the movable panel 4 to move in the tilt-down operation. When the button 63 is operated, the movable panel 4 moves towards the full-closed position with the tilting operation. The button 64 activates the movable panel 4 to move in the tilt-up direction. When the button 64 is operated, the movable panel 4 moves towards the tilt-up position with the tilting operation. The switch 61a, 62a, 63a, or 64a is turned to ON position only while the corresponding button 61, 62, 63, or 64 is operated. An operation signal for driving the motor 51 in the drive unit 5 is input from the switch 61a, 62a, 63a, or 64a to the microcomputer 13 by means of the input interface circuit 17 only while the corresponding button 61, 62, 63, or 64 is operated. Meanwhile, when the button 61, 62, 63, or 64 is released, the corresponding switch 61a, 62a, 63a, or 64a is turned to OFF position and then a stop signal for stopping the motor 51 is input to the microcomputer 13. The relay drive circuit 14 drives the relay contact 15 or 16 in response to such the signal, i.e. the operation signal and the stop signal, input to the microcomputer 13. The motor 51 in the drive unit 5 is operated or stopped accordingly.

The IG switch 70 outputs two types of signals depending on a position of a key 72 in a key cylinder 71. The key cylinder 71 and the key 72 each have a known structure so as to be provided at a vehicle. An OFF position, an ACCESSORY position, and a RUN position are specified for the key cylinder 71. In cases where the key 72 is in the OFF position, the engine is stopped. In cases where the key 72 is in the ACCESSORY position, the engine is stopped though electrical components such as an audio are operable. In cases where the key 72 is in the RUN position, the engine is in operation and the vehicle can run. When the key 72 is in the RUN position of the key cylinder 71, the IG switch 70 outputs an IG-ON signal. On the other hand, when the key 72 is in a position other than the RUN position, the IG switch 70 outputs an IG-OFF signal. The IG-ON signal and the IG-OFF signal are respectively input to the microcomputer 13 by means of the input interface circuit 17.

The operation permission switch 80 outputs two types of signals depending on a position of the key 72 in the key cylinder 71, and an open/close status of front doors 9 (see FIG. 1) of a vehicle. Precisely, when the key 72 is in the ACCESSORY position or the RUN position (i.e. condition 1), the operation permission switch 80 outputs an operation permission signal. The operation permission switch 80 outputs the operation permission signal for a predetermined time period (10 minutes, for example) in cases where the key 72 is turned to the OFF position from the RUN position or the key 72 is removed from the key cylinder 71, and at the same time any front doors 9 are not open (i.e. condition 2). On the other hand, when the condition 1 and the condition 2 are both not satisfied, the operation permission switch 80 outputs an operation prohibition signal. The operation permission signal and the operation prohibition signal are respectively input to the microcomputer 13 by means of the input interface circuit 17.

Next, a control conducted by the ECU 10 is explained with reference to flowcharts in FIGS. 8 to 11.

Figure 8:
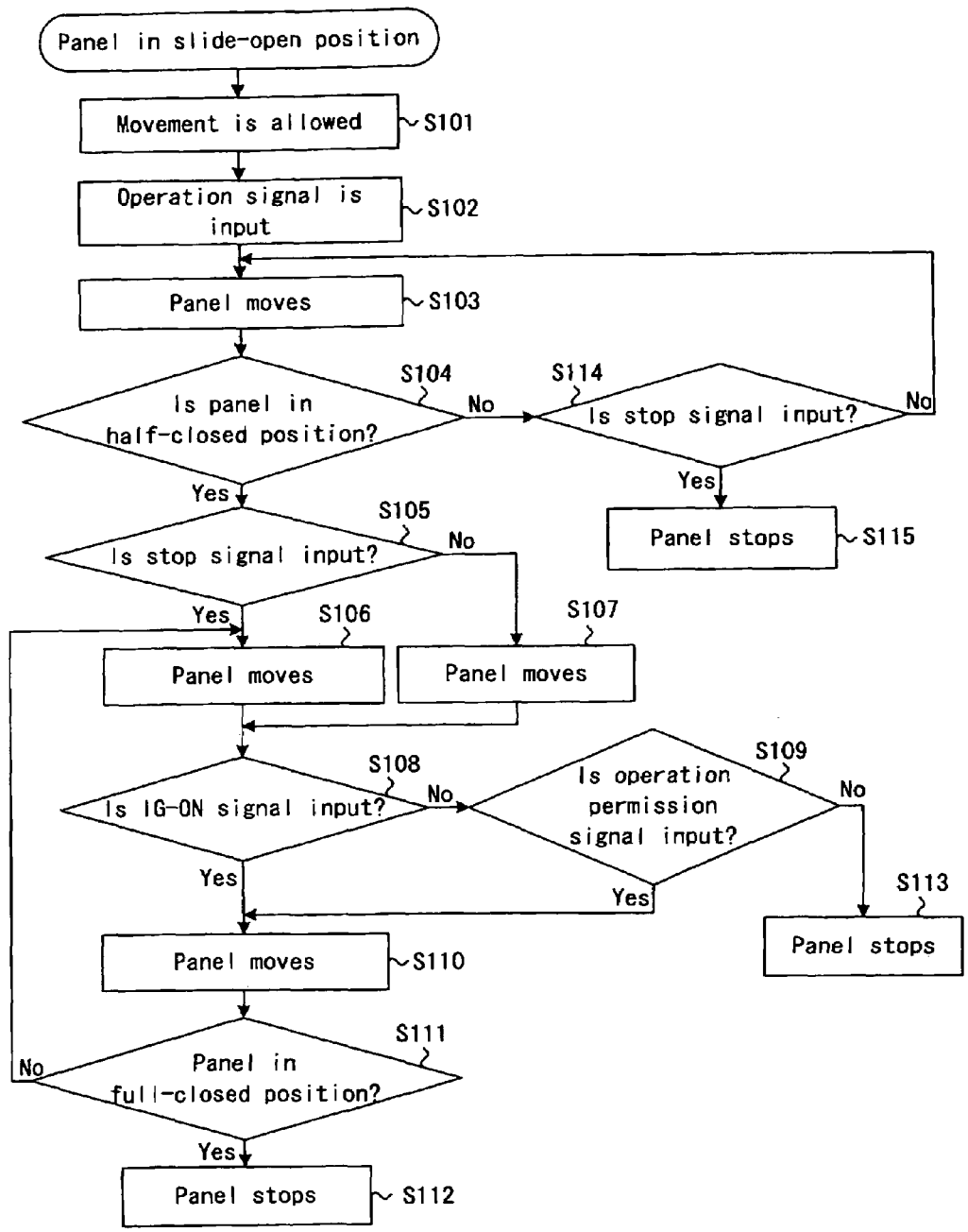
FIG. 8 is a flowchart of the sliding operation.
Figure 9:
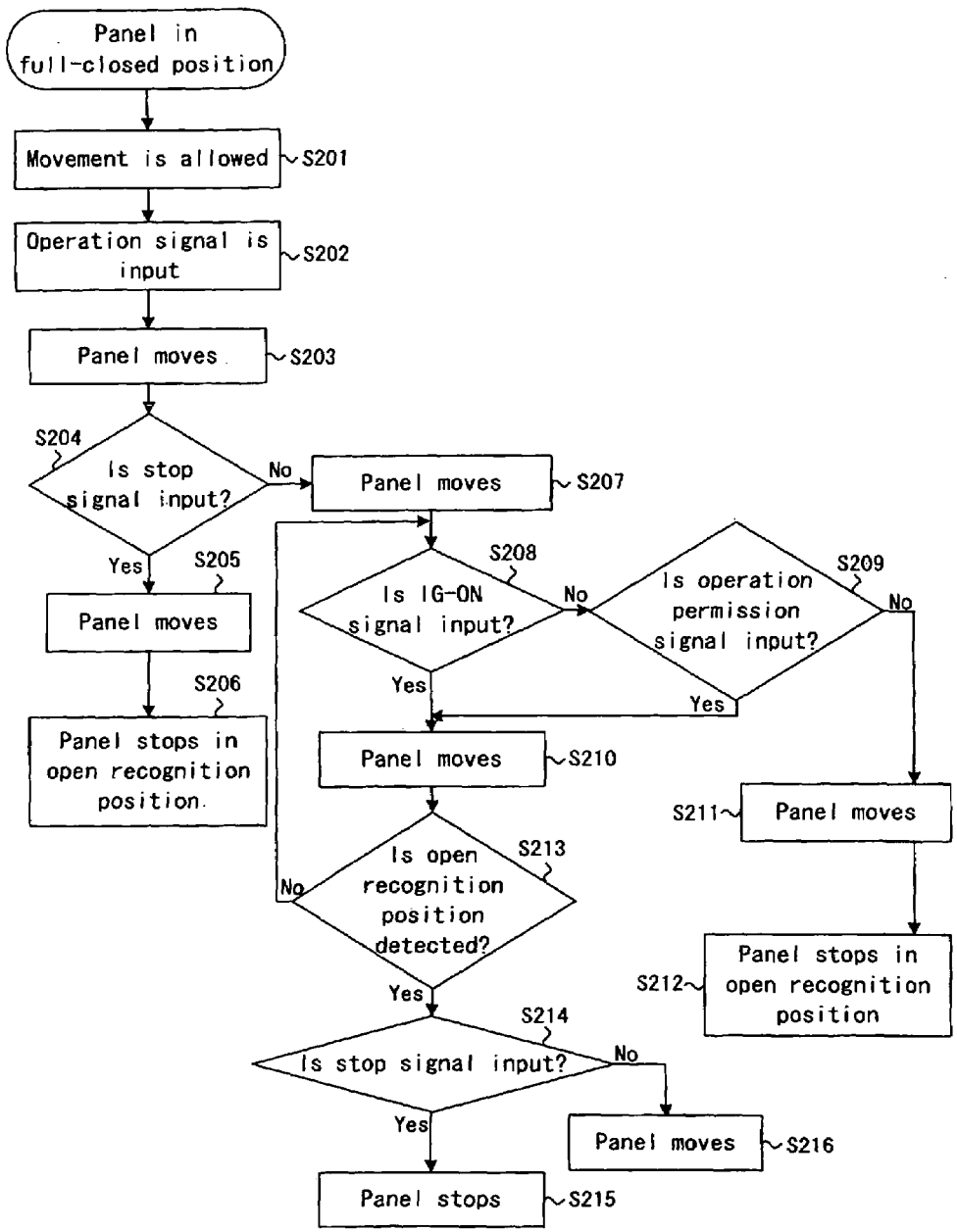
FIG. 9 is another flowchart of the sliding operation.

FIGS. 8 and 9 are the flowcharts showing the sliding operation of the movable panel 4. In cases where the movable panel 4 is moved from the slide-open position to the full-closed position, the ECU 10 (see FIG. 7) controls the operation of the motor 51 in the drive unit 5 based on the flowchart in FIG. 8.

The movable panel 4 stopped in the slide-open position is allowed to move in the slide-close direction when the IG-ON signal is input from the IG switch 70 to the microcomputer 13, or the operation permission signal is input from the operation permission switch 80 to the microcomputer 13.

In a state in which the movable panel 4 is allowed to move in Step (hereinafter referred to as "S") 101, with a passenger operating the button 61 the operation signal for operating the motor 51 in the drive unit 5 is input to the microcomputer 13 in S102. Then, the movable panel 4 moves in the slide-close direction in S103. The movable panel 4 moves in the slide-close direction only while the passenger is operating the button 61.

With the operation of the moter 51, pulse signals are input from the Hall ICs 11 and 12 to the microcomputer 13. The microcomputer 13 then counts the pulse signal input by the counter 30b of the CPU 30. The CPU 30 compares that count data counted by the counter 30b with the position data stored beforehand in the memory 30 a of the CPU 30 and then detects where the movable panel 4 is positioned at that time.

In cases where the CPU 30 in the microcomputer 13 detects that the movable panel 4 is in the half-closed position in S104, the movable panel 4 starts an automatic closing operation. As mentioned above, the stop signal for stopping the motor 51 is input to the microcomputer 13 when the passenger releases the button 61. However, in the automatic closing operation, even if the stop signal is input to the microcomputer 13 in S105, the movable panel 4 continues to move in the slide-close direction in S106. When the passenger keeps operating the button 61 so that the operation signal is input to the microcomputer 13 in S105, i.e. the stop signal is not input to the microcomputer 13, the movable panel 4 continues to move in the slide-close direction in S107.

Meanwhile, in cases where the CPU 30 detects that the movable panel 4 is not in the half-closed position in S104, the movable panel 4 does not operate the automatic closing operation. When the stop signal is input to the microcomputer 13 in S114, the movable panel 4 stops operating in S115. When the stop signal is not input to the microcomputer 13, i.e. the operation signal is input to the microcomputer 13 in S114, the movable panel 4 moves in S103. That is, the movable panel 4 moves to the slide-close direction only while the passenger operates the button 61.

In the automatic closing operation, the movable panel 4 keeps moving in the slide-close direction in S110 in cases where the IG-ON signal is input from the IG switch 70 to the microcomputer 13 in S108 or the operation permission signal is input from the operation permission switch 80 to the microcomputer 13 in S109. When the CPU 30 detects that the movable panel 4 is in the full-closed position in S111, the microcomputer 13 stops the operation of the motor 51 in the drive unit 5, thereby stopping the movable panel 4 in S112.

On the other hand, in the automatic closing operation, in cases where neither the IG-ON signal nor the operation permission signal are input to the microcomputer 13, i.e. both the IG-OFF signal and the operation prohibition signal are input to the microcomputer 13 in S108 and S109 respectively, the microcomputer 13 stops the operation of the motor 51 so as to stop the movable panel 4 in S113.

Next, in cases where the movable panel 4 is moved from the full-closed position to the slide-open position, the ECU 10 controls the operation of the motor 51 in the drive unit 5 in accordance with the flowchart in FIG. 9.

The movable panel 4 stopped in the full-closed position is allowed to move in the slide-open direction when the IG-ON signal is input from the IG switch 70 to the microcomputer 13 or the operation permission signal is input from the operation permission switch 80 to the microcomputer 13.

In a state in which the movable panel 4 is allowed to move in S201, with the passenger operating the button 62 the operation signal is input to the microcomputer 13 in S202, then the movable panel 4 moves in the slide-open direction in S203.

The movable panel 4 performs an automatic opening operation until the CPU 30 in the microcomputer 13 detects that the movable panel 4 is in the open recognition position in S213. In the automatic opening operation, even if the stop signal is input to the microcomputer 13 in S204, the movable panel 4 keeps moving in the slide-open direction in S205. In this case, if the CPU 30 detects that the movable panel 4 is in the open recognition position, the movable panel 4 stops in the open recognition position in S206.

In the automatic opening operation, if the operation signal is input to the microcomputer 13 (i.e. the stop signal is not input) in S204, the movable panel 4 keeps moving in the slide-open direction in S207. Then, when the IG-ON signal is input from the IG switch 70 to the microcomputer 13 in S208 or the operation permission signal is input from the operation permission switch 80 to the microcomputer 13 in S209, the movable panel 4 keeps moving in the slide-open direction in S210. Further, in the automatic opening operation, even if neither the IG-ON signal nor the operation permission signal are input to the microcomputer 13, i.e. both the IG-OFF signal and the operation prohibition signal are input to the microcomputer 13 in S208 and S209 respectively, the movable panel 4 keeps moving in the slide-open direction in S211. When the CPU 30 detects that the movable panel 4 is in the open recognition position, the movable panel 4 stops operating in S212.

After the CPU 30 detects that the movable panel 4 is in the open recognition position in S213, the movable panel 4 never performs the automatic opening operation. When the stop signal is input to the microcomputer 13 in S214, the movable panel 4 stops operating in S215. In cases where the stop signal is not input to the microcomputer 13, i.e. the passenger keeps operating the button 62 so that the operation signal is input to the microcomputer 13 in S214, the movable panel 4 moves in the slide-open direction in S216. The movable panel 4 keeps moving until the passenger releases the button 62.

Figure 10:
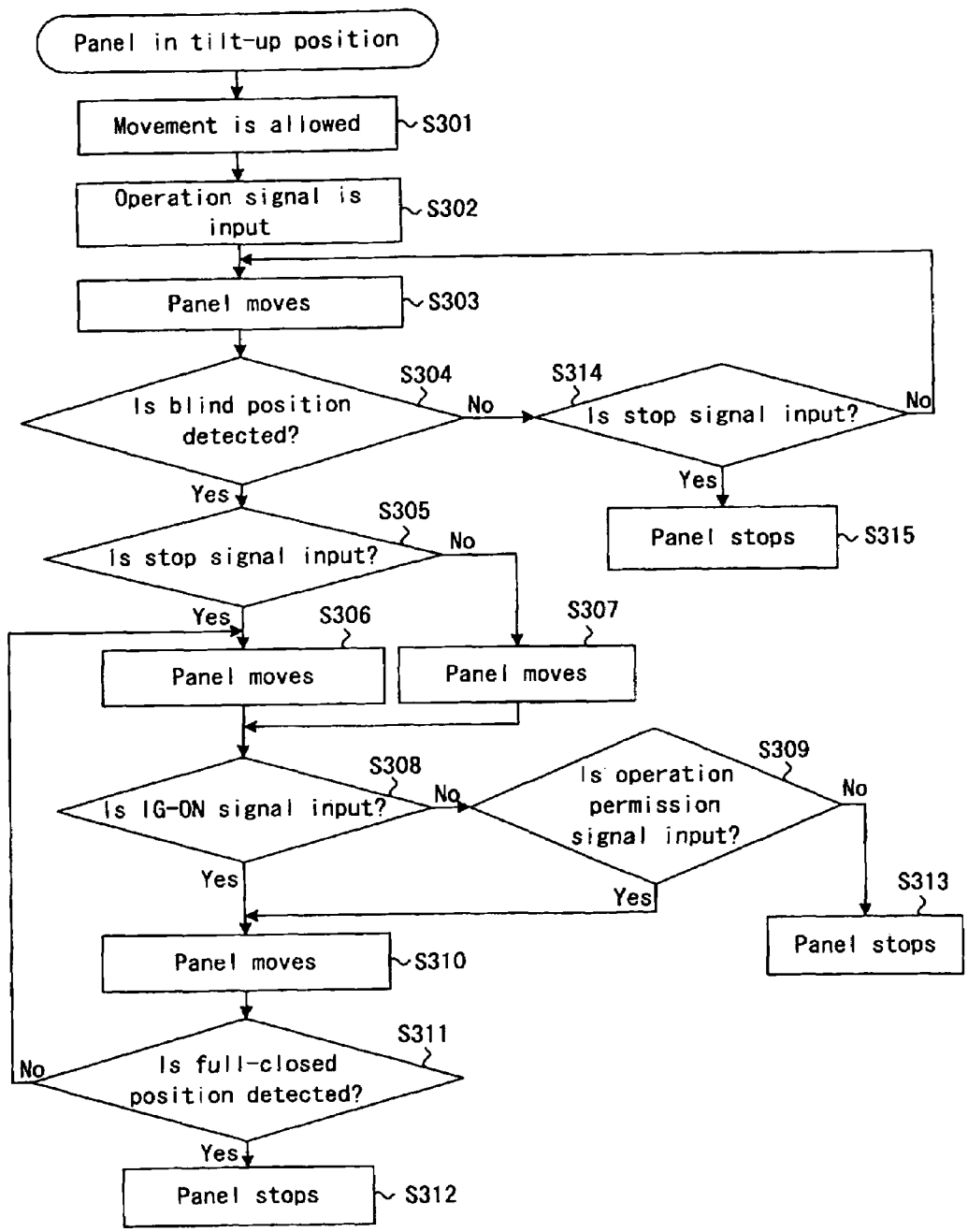
FIG. 10 is a flowchart of the tilting operation.
Figure 11:
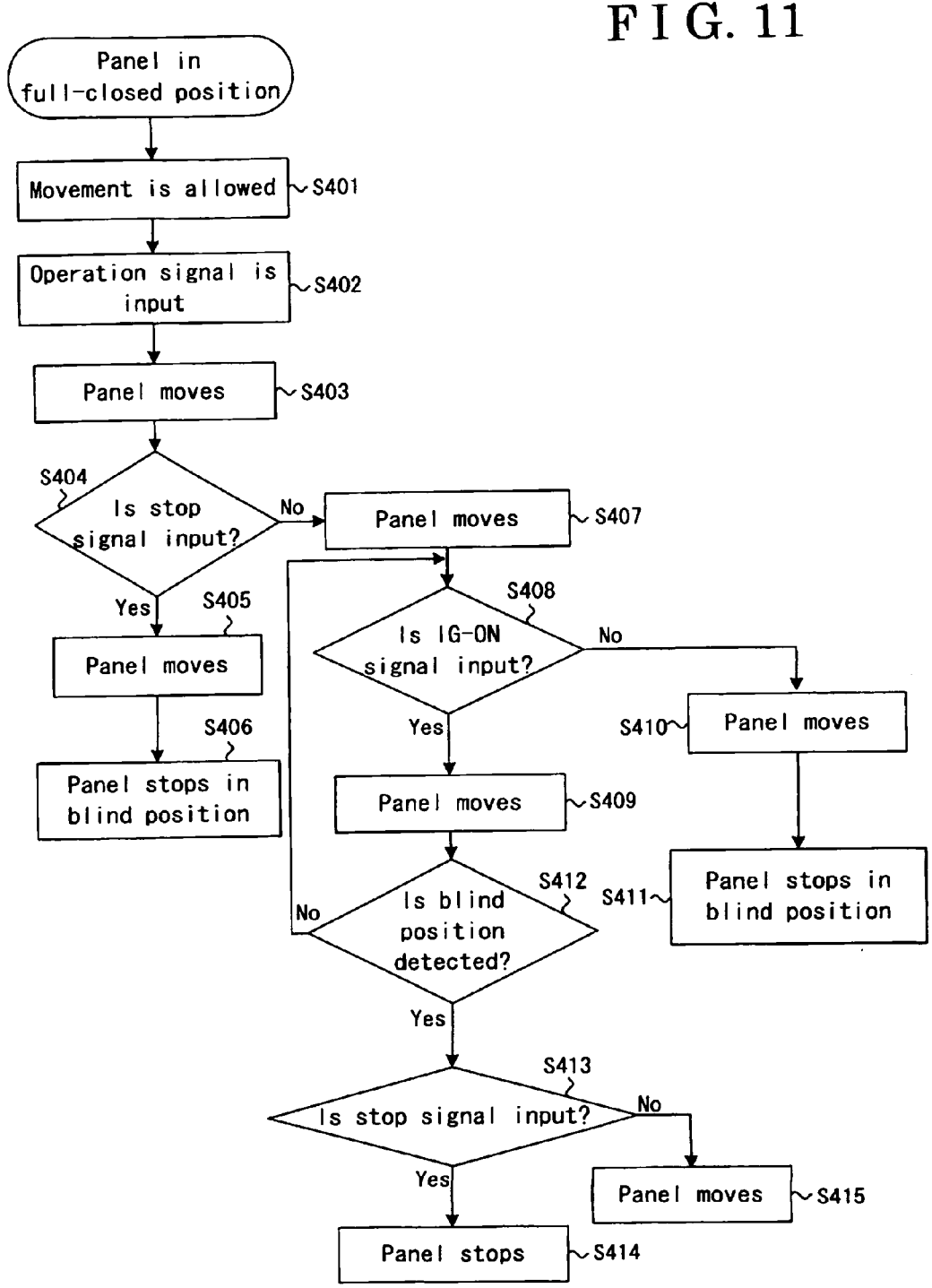
FIG. 11 is another flowchart of the tilting operation.

FIGS. 10 and 11 are flowcharts for explaining the tilting operation. In cases where the movable panel 4 is moved from the tilt-up position to the full-closed position, the ECU 10 controls the operation of the motor 51 in the drive unit 5 in accordance with the flowchart in FIG. 10.

The movable panel 4 stopped in the tilt-up position is allowed to move in the tilt-down direction when the IG-ON signal is input from the IG switch 70 to the microcomputer 13, or the operation permission signal is input from the operation permission switch 80 to the microcomputer 13.

In a state in which the movable panel 4 is allowed to move in S301, with the passenger operating the button 63 the operation signal for operating the motor 51 in the drive unit 5 is input to the microcomputer 13 in S302. The movable panel 4 then moves in the tilt-down direction in S303. The movable panel 4 moves in the tilt-down direction only while the passenger operates the button 63.

In cases where the CPU 30 in the microcomputer 13 detects that the movable panel 4 is in the blind position in S304, the movable panel 4 starts performing an automatic tilt-down operation. As mentioned above, the stop signal is input to the microcomputer 13 for stopping the motor 51 when the passenger releases the button 63. However, in the automatic tilt-down operation, even if the stop signal is input to the microcomputer 13 in S305, the movable panel 4 keeps moving in the tilt-down direction in S306. When the passenger keeps operating the button 63 so that the operation signal is input to the microcomputer 13, i.e. the stop signal is not input to the microcomputer 13, in S305, the movable panel 4 keeps moving in the tile-down direction in S307.

Meanwhile, in cases where the CPU 30 detects that the movable panel 4 is not in the blind position in S304, the movable panel 4 does not perform the automatic tilt-down operation. When the stop signal is input to the microcomputer 13 in S314, the movable panel 4 stops operating in S315. In cases where the stop signal is not input to the microcomputer 13, i.e. the operation signal is input to the microcomputer 13 in S314, the movable panel 4 keeps moving in S303. The movable panel 4 moves in the tilt-down direction only while the passenger operates the button 63.

In the automatic tilt-down operation, when the IG-ON signal is input from the IG switch 70 to the microcomputer 13 in S308 or the operation permission signal is input from the operation permission switch 80 to the microcomputer 13 in S309, the movable panel 4 keeps moving in the tilt-down direction in S310. Then, when the CPU 30 detects that the movable panel 4 is in the full-closed position in S311, the microcomputer 13 stops the operation of the motor 51 in the drive unit 5 so as to sop the movable panel 4 in S312.

Meanwhile, in the automatic tilt-down operation, in cases where neither the IG-ON signal nor the operation permission signal are input to the microcomputer 13, i.e. both the IG-OFF signal and the operation prohibition signal are input to the microcomputer 13 in S308 and S309 respectively, the microcomputer 13 stops the operation of the motor 51 in the drive unit 5 so as to stop the movable panel 4 in S313.

Next, in cases where the movable panel 4 is moved from the full-closed position to the tilt-up position, the ECU 10 controls the operation of the motor 51 in the drive unit 5 in accordance with the flowchart in FIG. 11.

The movable panel 4 stopped in the full-closed position is allowed to move in the tilt-up direction when the IG-ON signal is input from the IG switch 70 to the microcomputer 13, or the operation permission signal is input from the operation permission switch 80 to the microcomputer 13.

In a state in which the movable panel 4 is allowed to move in S401, with the passenger operating the button 64 the operation signal is input to the microcomputer 13 in S402. Then, the movable panel 4 moves in the tilt-up direction in S403.

611 The movable panel 4 performs an automatic tilt-up operation until the CPU 30 in the microcomputer 13 detects that the movable panel 4 is in the blind position (i.e. in S412). In the automatic tilt-up operation, even if the stop signal is input to the microcomputer 13 in S404, the movable panel 4 keeps moving in the tilt-up direction in S405. In this case, when the CPU 30 detects that the movable panel 4 is in the blind position, the movable panel 4 stops in the blind position in S406.

In the automatic tilt-up operation, if the stop signal is not input, i.e. the operation signal is input to the microcomputer 13 in S404, the movable panel 4 keeps moving in the tilt-up direction in S407. Then, when the IG-ON signal is input from the IG switch 70 to the microcomputer 13 in S408, the movable panel 4 keeps moving in the tilt-up direction in S409. Further, when the IG-OFF signal is input to the microcomputer 13 in S408, the movable panel 4 keeps moving in the tilt-up direction in S410. When the CPU 30 detects that the movable panel 4 is in the blind position, the movable panel 4 stops operating in S411.

After the CPU 30 detects that the movable panel 4 is in the blind position in S412, the movable panel 4 never performs the automatic tilt-up operation. When the stop signal is input to the microcomputer 13 in S413, the movable panel stops operating in S414. In cases where the stop signal is not input to the microcomputer 13, i.e. the passenger keeps operating the button 64 so that the operation signal is input to the microcomputer 13 in S413, the movable panel 4 moves in the tilt-up direction in S415. The movable panel 4 keeps moving until the passenger releases the button 64.

According to the aforementioned sunroof device 1, in cases where the movable panel 4 moves to the full-closed position by means of the operation of the button 61, the ECU 10 drives the motor 51 in the drive unit 5 until the movable panel 4 reaches the full-closed position even if the button 61 is released after the movable panel 4 passes over the half-closed position. In cases where the movable panel 4 is positioned between the half-closed position and the slide-open position, a part of the inner opening portion 32 of the ceiling member 22 is not covered and thus the passenger in the vehicle interior can recognize that the outer opening portion 31 of the roof panel 21 is not closed, i.e. open. On the other hand, when the movable panel 4 is in the half-closed position, the inner opening portion 32 of the ceiling member 22 is covered and thus the passenger in the vehicle interior is not sure if the outer opening portion 31 of the roof panel 21 is completely closed. According to the aforementioned embodiment, even if the passenger releases the button 61 after the movable panel 4 passes over the half-closed position, the motor 51 in the drive unit 5 keeps operating until the movable panel 4 reaches the full-closed position. Thus, the movable panel 4 is prevented from stopping between the half-closed position and the full-closed position, i.e. the incomplete opening position. When the passenger intends to close the outer opening portion 31 of the roof panel 21, the movable panel 4 completely covers the outer opening portion 31 and no gap is formed between the outer opening portion 31 and the movable panel 4, thereby preventing problems such as leaking of rain.

Further, according to the aforementioned embodiment, in cases where the button 62 is once operated with the movable panel 4 in the full-closed position, the ECU 10 drives the motor 51 in the drive unit 5 until the movable panel 4 at least passes over the half-closed position and reaches the open recognition position even if the button 62 is released. In cases where the movable panel 4 is positioned between the full-closed position and the half-closed position, the inner opening portion 32 of the ceiling member 22 is covered and thus the passenger in the vehicle interior is not sure if the outer opening portion 31 of the roof panel 21 is completely closed. On the other hand, when the movable panel 4 passes over the half-closed position and then reaches the open recognition position, a part of the inner opening portion 32 of the ceiling member 22 is not covered and thus the passenger can recognize that the outer opening portion 31 of the roof panel 21 is open, i.e. not closed. According to the aforementioned embodiment, the motor 51 in the drive unit 5 keeps operating, even if the passenger releases the button 62, until the movable panel 4 passes over the half-closed position and reaches the open recognition position. Thus, the movable panel 4 is prevented from stopping between the half-closed position and the full-closed position, i.e. incomplete closed position. Therefore, even if the passenger wrongly operates the button 62 in spite of the intention of closing the outer opening portion 31 of the roof panel 21, the movable panel 4 in the full-closed position moves up to the open recognition position after passing over the half-closed position. The passenger can recognize that the outer opening portion 31 of the roof panel 21 is open, i.e. not closed. Then, by the passenger again operating the button 61, the outer opening portion 31 of the roof panel 21 is completely closed by the movable panel 4. Accordingly, a gap is not formed between the outer opening portion 31 of the roof panel 21 and the movable panel 4, thereby avoiding problems such as leaking of rain.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A sunroof device comprising:
   a roof panel for forming an exterior of a vehicle and having a first opening portion;
   a ceiling member for forming a ceiling of a vehicle interior below the roof panel and having a second opening portion so as to face the first opening portion;
   a movable panel moved between a full-closed position in which the first opening portion is completely closed and an open position in which the first opening portion is open, the movable panel passing through a half-closed position in which a part of the first opening portion is open and the second opening portion is closed when the movable panel moves between the full-closed position and the open position;
   a motor for driving the movable panel;
   a controlling means for controlling an operation of the motor;
   an operating member to be operated or released by a passenger in the vehicle; and
   a switch for inputting an operation signal to the controlling means for operating the motor during continued operation of the operating member, and inputting a stop signal to the controlling means for stopping the motor when the continued operation of the operating member is released; wherein the controlling means continues driving the motor until the movable panel reaches the full-closed position even if the operating member is released after the movable panel reaches the half-closed position while moving towards the full-closed position.

2. A sunroof device comprising:
   a roof panel forming an exterior of a vehicle and having a first opening portion;
   a ceiling member forming a ceiling of a vehicle interior below the roof panel and having a second opening portion so as to face the first opening portion;
   a movable panel moved between a full-closed position in which the first opening portion is completely closed and an open position in which the first opening portion is open, the movable panel passing through a half-closed position in which a part of the first opening portion is open and the second opening portion is closed when the movable panel moves between the full-closed position and the open position;
   a motor for driving the movable panel;
   a controlling means for controlling an operation of the motor;
   an operating member to be operated or released by a passenger in the vehicle; and
   a switch for inputting an operation signal to the controlling means for operating the motor during continued operation of the operating member, and inputting a stop signal to the controlling means for stopping the motor when the continued operation of the operating member is released; wherein the controlling means controls the motor to operate until the movable panel passes over at least the half-closed position while moving from the full-closed position by the continued operation of the operating member even if the operating member is released after once operated.

3. A sunroof device according to claim 1, wherein the controlling means controls the motor to operate until the movable panel passes over at least the half-closed position while moving from the full-closed position by the operating member being operated even if the operating member is released after once operated.

4. A sunroof device according to claim 3, wherein the controlling means includes an operation detecting means for outputting a pulse signal along with an operation of the motor, a counting means for counting the pulse signal output from the operation detecting means, and a storing means for storing a position data of the movable panel corresponding to a count data of the counting means, and the controlling means detects whether the movable panel is in the half-closed position by comparing the count data and the position data.

5. A sunroof device according to claim 4, wherein the controlling means drives the motor until the movable panel reaches an open recognition position which is located on a side opposite to the full-closed position relative to the half-closed position while moving from the full-closed position by the operating member being operated even if the operating member is released after once operated.

6. A sunroof device according to claim 5, wherein the movable panel performs a sliding operation by moving from the full-closed position to the open position in a vehicle rearward direction, and moving from the open position to the full-closed position in a vehicle forward direction, and the half-closed position and the open recognition position are specified for the sliding operation.

7. A sunroof device according to claim 6, wherein a front edge of the first opening portion is positioned on a front side in the vehicle relative to a front edge of the second opening portion.

8. A sunroof device according to claim 7, wherein when the movable panel is in the half-closed position, a front edge of the movable panel is positioned on the front side relative to the front edge of the second opening portion and on a rear side relative to the front edge of the first opening portion.

9. A sunroof device according to claim 8, wherein the storing means stores a first position data corresponding to the half-closed position and a second position data corresponding to the open recognition position, and the first position data and the second position data are different from each other.

10. A sunroof device according to claim 9, wherein when a key of the vehicle is removed from a key cylinder and at the same time any one of front doors is open, the controlling means prohibits the movable panel to move towards the full-closed position.

11. A sunroof device according to claim 10, wherein even if the key of the vehicle is removed from the key cylinder and at the same time any one of the front doors is open, the controlling means allows the movable panel to move towards the open position until the movable panel passes over at least the half-closed position.

12. A sunroof device according to claim 2, wherein the controlling means controls the motor to continue operating until the movable panel, moving from the full-closed position by the operation of the operating member, passes over at least the half-closed position even if the operating member is released after being once operated and then controls the motor to stop operating after the movable panel passes over at least the half-closed position before reaching the open position.

* * * * *